(12) United States Patent
Kim

(10) Patent No.: US 10,704,731 B2
(45) Date of Patent: Jul. 7, 2020

(54) SIXPOD FOR CAMERA, SPEAKER AND THE LIKE

(71) Applicant: Sun Kyoung Kim, Seoul (KR)

(72) Inventor: Sun Kyoung Kim, Seoul (KR)

(*) Notice: Subject to any disclaimer, the term of this patent is extended or adjusted under 35 U.S.C. 154(b) by 0 days.

(21) Appl. No.: 15/882,550

(22) Filed: Jan. 29, 2018

(65) Prior Publication Data
US 2019/0234555 A1   Aug. 1, 2019

(51) Int. Cl.
| | |
|---|---|
| *F16M 11/38* | (2006.01) |
| *F16M 11/24* | (2006.01) |
| *F16M 11/04* | (2006.01) |
| *G03B 17/56* | (2006.01) |
| *F21V 21/10* | (2006.01) |
| *H04R 1/02* | (2006.01) |
| *F16B 2/12* | (2006.01) |
| *F16B 2/06* | (2006.01) |
| *F16B 7/14* | (2006.01) |

(52) U.S. Cl.
CPC ............. *F16M 11/38* (2013.01); *F16B 2/065* (2013.01); *F16B 2/12* (2013.01); *F16B 7/1418* (2013.01); *F16M 11/04* (2013.01); *F16M 11/245* (2013.01); *F21V 21/10* (2013.01); *G03B 17/561* (2013.01); *H04R 1/026* (2013.01)

(58) Field of Classification Search
CPC ...... F16M 11/38; F16M 11/245; F16M 11/04; F16M 11/28; F16M 11/30; F16M 11/32; F16M 11/34; F16M 11/40; F16B 2/12; F21V 21/10; G03B 17/561; H04R 1/026; A47F 5/01; A47F 5/13

USPC .................................................. 248/170–171
See application file for complete search history.

(56) References Cited

U.S. PATENT DOCUMENTS

| | | | | | |
|---|---|---|---|---|---|
| 1,510,272 | A | * | 9/1924 | Harmount | A47G 25/0664 211/204 |
| 5,072,910 | A | * | 12/1991 | May | F16M 11/28 248/170 |
| 5,934,628 | A | * | 8/1999 | Bosnakovic | B60Q 7/00 248/169 |

* cited by examiner

*Primary Examiner* — Christopher Garft
(74) *Attorney, Agent, or Firm* — Stephen Chai

(57) ABSTRACT

Sixpod stand for camera, speaker and the like is invented to place heavy camera, speaker or photo studio background support etc. Existing Tripod stand for camera, speaker and the like has only one column and three legs so that it cannot support heavy objects on the top of tripod stand. Namely, the current tripod stand is too weak to support such a heavy object. In addition, since the current tripod stand has only one extended rod, it cannot make its height longer than a sixpod stand. Especially the tripod is impossible to be used as a supporter for a photo studio background which need both strength and height.

On the other hand, sixpod stand has two columns and six legs. Six legs support two columns and inside of two columns, there are three respective rods in two respective columns inner surface by outer surface so that the height of sixpod stand could be extended as high as the length of three rods inside of two columns. People could not only place a heavy object on the top of sixpod but also place such a heavy object on the position which is as high as the length of three rods inside of two columns.

3 Claims, 11 Drawing Sheets

SIXPOD FOR CAMERA, SPEAKER AND THE LIKE

CROSS REFERENCE TO RELATED APPLICATIONS

U.S. Pat. No. 2,282,285, Inventor: H. T. Olson

FIELD OF INVENTION

The present invention relates to a sixpod stand for camera, speaker and the like, having two columns jointed through two double-cross type joint, wherein one double-cross type joint is placed on the upper parts of two columns and the other is placed on the bottom of two columns. To support two columns, six legs are hinged on the upper double-cross columns through clamping means and twelve respective supporting brace rods are hinged on both bottom double-cross type joint and six legs through clamping means.

The sixpod structure with two columns above makes it possible for a person to fold or unfold six legs which could strongly support heavy camera, speaker and the like.

Two columns respectively contains three respective rods having empty space in their inner spaces. The first respective rods in each column are clamped with the first joint with a twisting clamp, which is placed on the top end of two respective columns, having the outer surface of the first two respective rods face the inner surface of two respective columns.

The second respective rods within the first respective rods in each column are clamped with the second joint with a twisting clamp, which is placed on the top end of the first respective rods, having the outer surface of the second respective rods face the inner surface of the first respective rods The third respective rods within the second respective rods in the first respective rods are clamped with the third joint with a twisting clamp, which is placed on the top end of the second respective rods.

The structure of three respective rods in two columns and three respective joints for the sixpod stand above makes it possible for a person to extend or reduce the height of sixpod stand by pulling up three respective rods in two columns or pulling down three respective rods in two columns.

The third respective rods have two respective bolt-shaped ends. On two respective ends, one bar which has both respective holes on the ends and one bolt in the middle could be placed on the third respective rods while those two respective bolt-shaped ends penetrate into two respective holes of one bar's respective ends. Butterfly-typed nuts are clamped with two respective bolt-shaped ends and one bolt in the middle of the bar.

People can place a heavy camera, speaker and the like on the tops of third respective rods of sixpod stand and can clamp them to the tops of third respective rods by using two bolt-shaped ends on the third respective rods, one bolt in the middle of the bar with three butterfly-shaped nuts.

BACKGROUND OF INVENTION

The present invention contrives to solve the disadvantages of the prior art. The present invention provides two columns with two double-cross type, six legs and twelve supporting brace rods. It also provides three respective extendable rods inside of each column.

The object of present invention is to provide a strong support system for a heavy camera, speaker, light and photo studio background by placing them on the tops of sixpod stand.

The disadvantage of prior art, tripod stand, is that first, it cannot support heavy weight of camera, speaker and light and so on, since it has only three legs and one column, second, it cannot extend longer than the length of column and one rod in column's interiority. The height of current tripod stand does not usually go beyond 5 to six feet since it does not have other extendable rods within the column of sixpodstand.

SUMMARY OF INVENTION

The present invention contrives to solve the disadvantages of the prior art. The present invention provide a sixpod supporting system having two columns with three respective rods in each column, six legs, two double-cross type joints, and twelve support brace rods.

The object of the present invention is to clamp two columns through two double-cross type joints consisting of the upper double-cross type joint with six clamping means and the lower double-cross type joint having six clamping means.

Another object of the present invention is to clamp six legs to the upper double-cross type joint by using six clamping means located in the upper double-cross type joint.

The third object of the present invention is to clamp twelve rods to the lower double-cross type joint by using clamping means and also clamp the other end of twelve rods to roughly the middle of six legs by using clamping means Fourth object of the present invention is to place three respective rods in respective two columns and the ends of three respective rods in respective columns are clamped by three respective joints located above the upper double-cross type joint.

Fifth object of the present invention is to render the third respective rods in each column have bolt-shaped ends on which one bar having one bolt on are placed with three with three butterfly-shaped nuts.

The advantages of the present invention are: (1) the sixpod stand provides a strong stand due to its six legs, two columns and twelve support brace rods so that people can place heavy things like a speaker, a camera and a light on the top of the sixpod.

(2) the sixpod stand can provide roughly a 9 feet extension by pulling up three respective rods inside of each column.

(3) the sixpod stand could easily be folded and unfolded so that people could carry it easily.

BRIEF DESCRIPTION OF DRAWINGS

These and other features, aspects and advantages of the present invention will become better understood with reference to the accompanying drawings, wherein.

DETAILED DESCRIPTION EMBODIMENTS OF INVENTION

Figure 1:
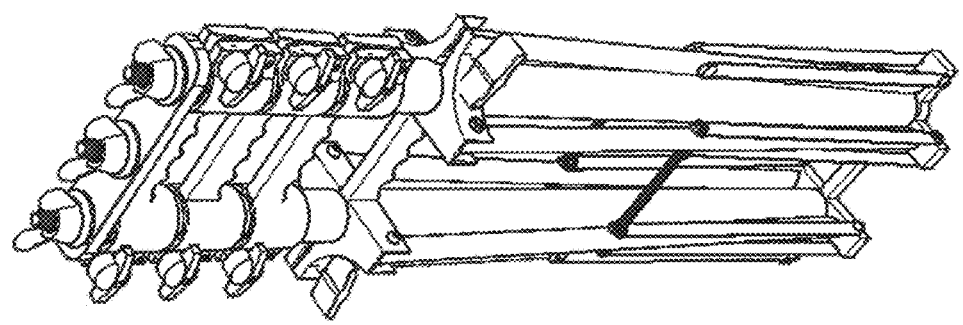
FIG. 1 shows a perspective view of sixpod stand where six legs and two rods are folded.
Figure 2:
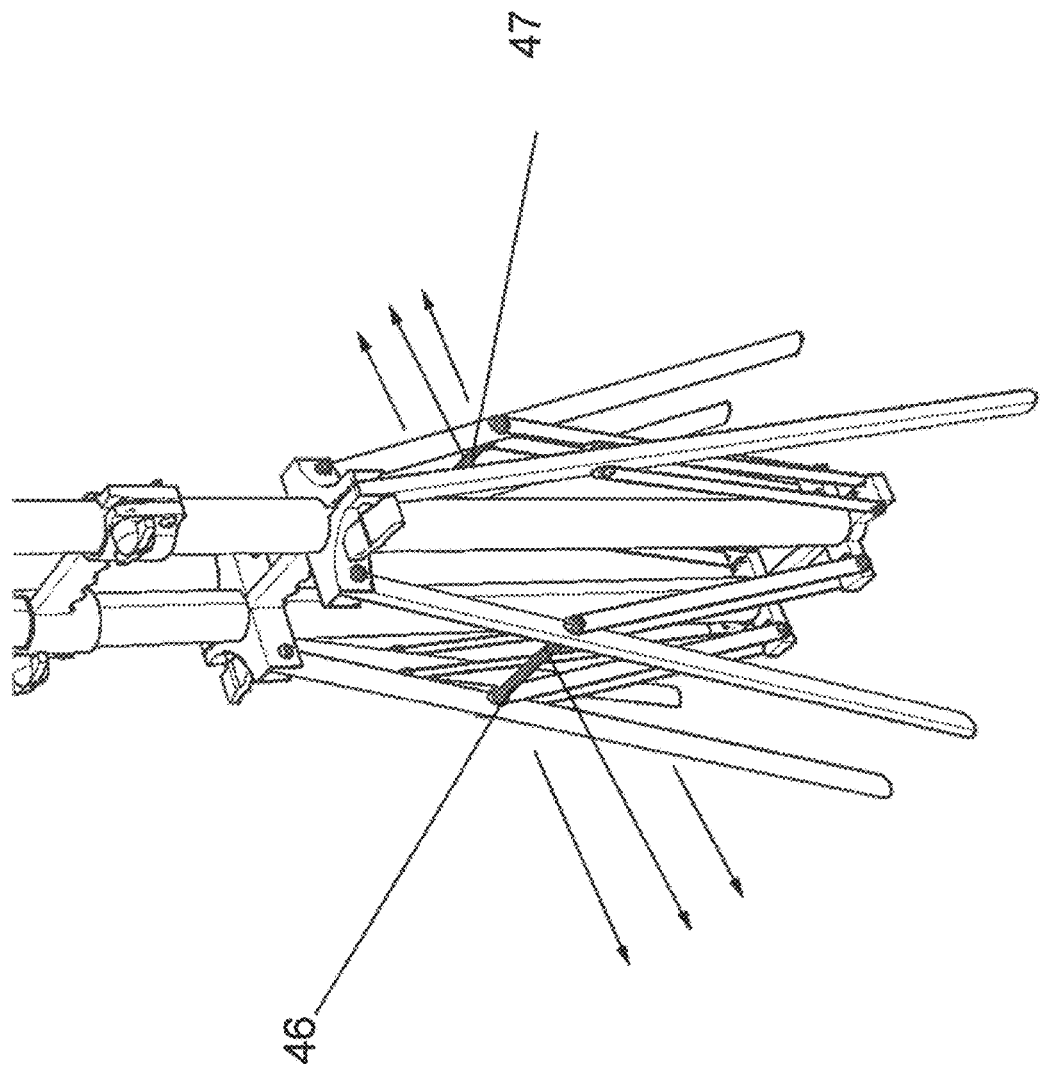
FIG. 2 shows a perspective view of sixpod stand wherein six legs are being unfolded with hand.
Figure 3:
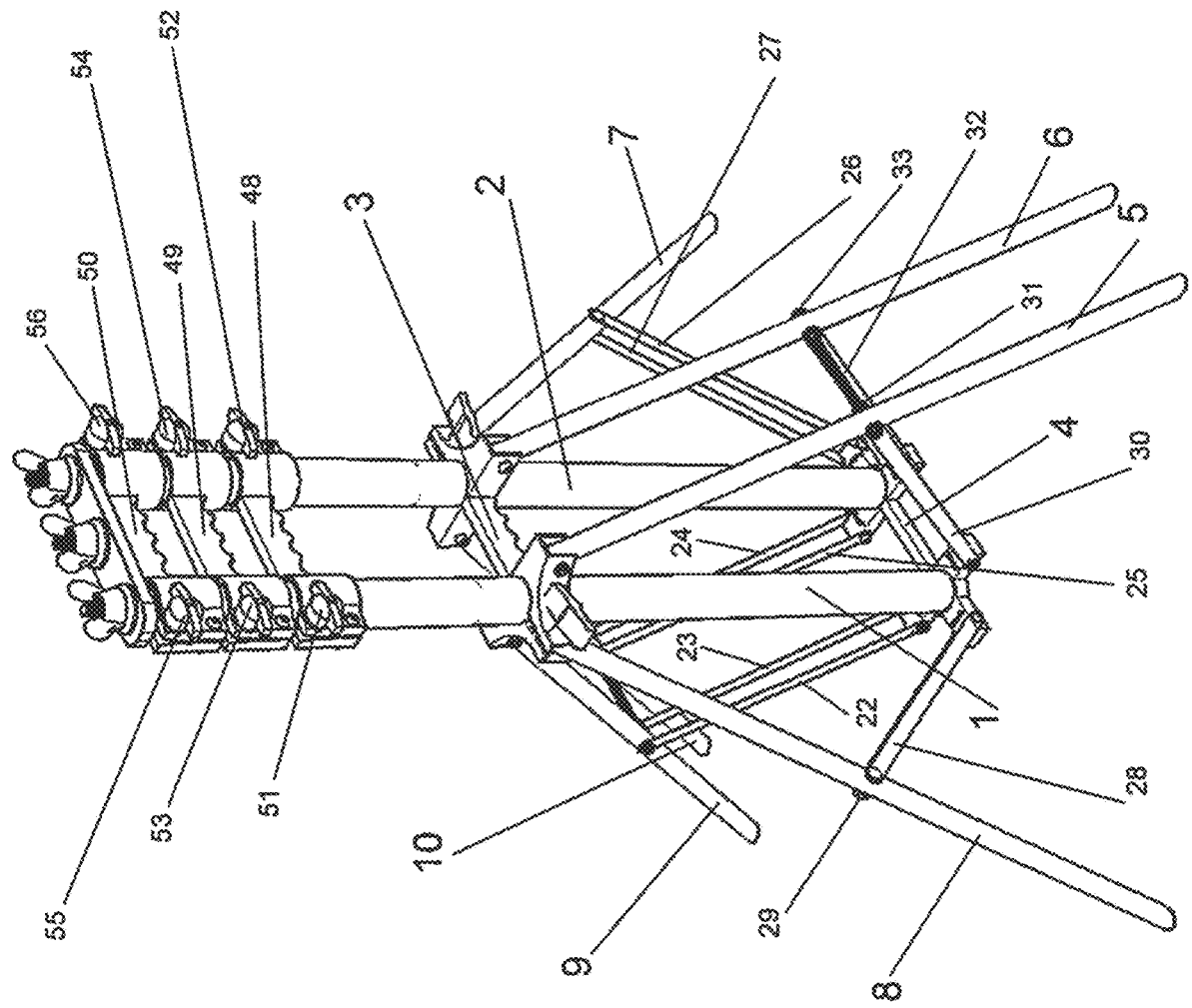
FIG. 3 shows a perspective view of view of sixpod stand wherein six legs are completed unfolded.
Figure 4:
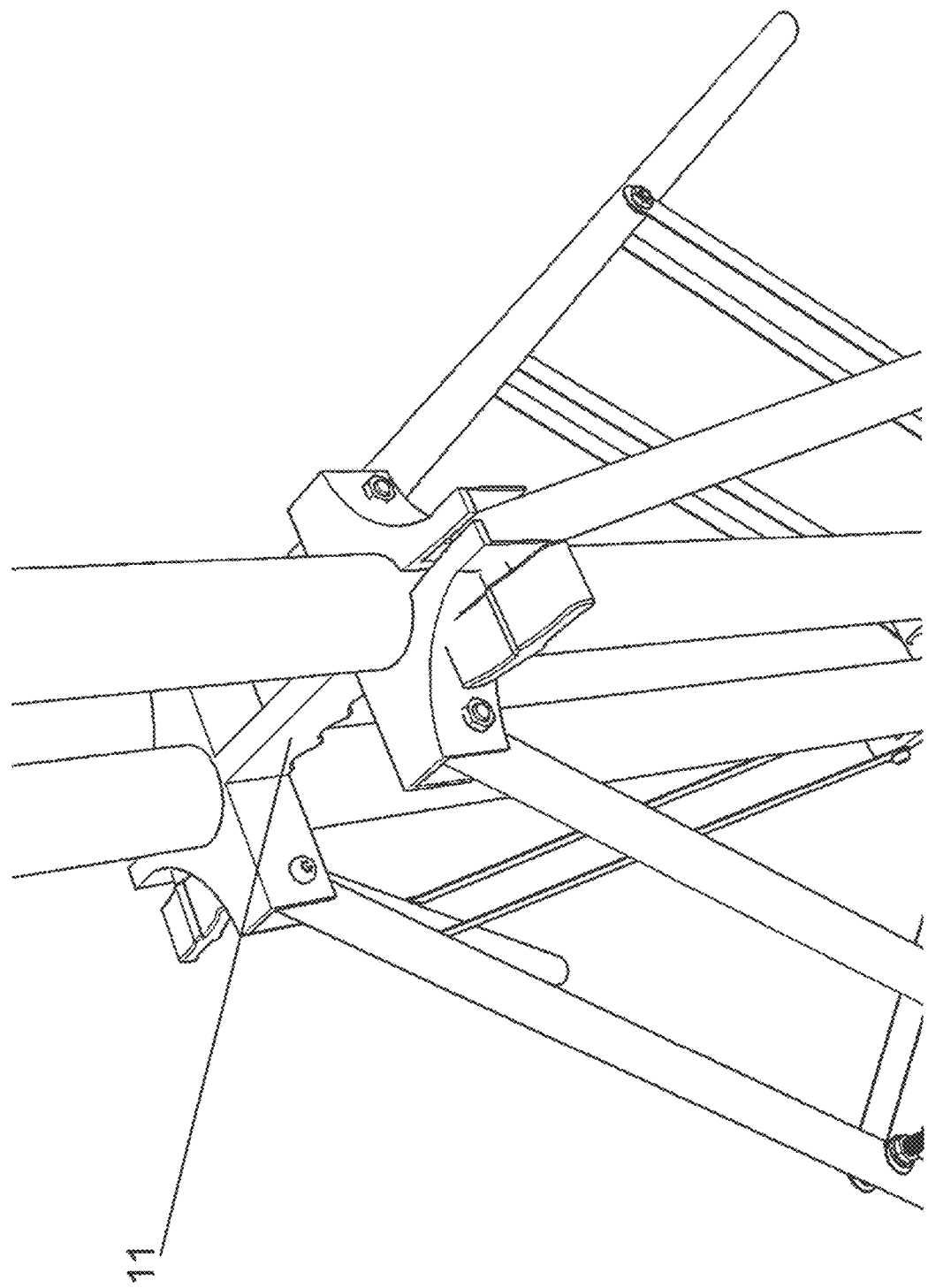
FIG. 4 shows a left-side perspective view of sixpod stand, which shows a double-cross type joint.
Figure 5:
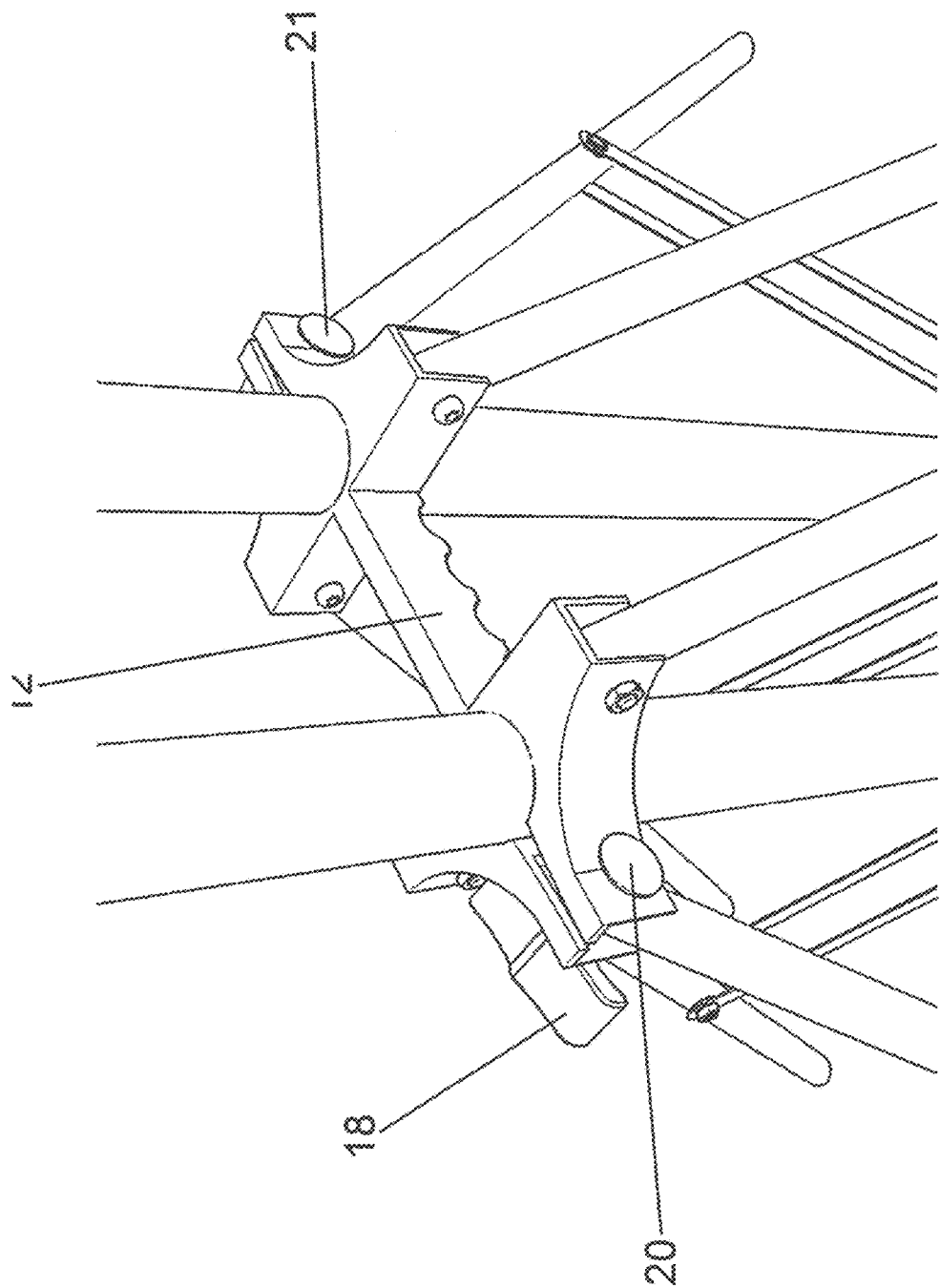
FIG. 5 shows an enlarged right-side perspective view of sixpod stand, which shows and enlarged double-cross wherein six legs are unfolded.
Figure 6:
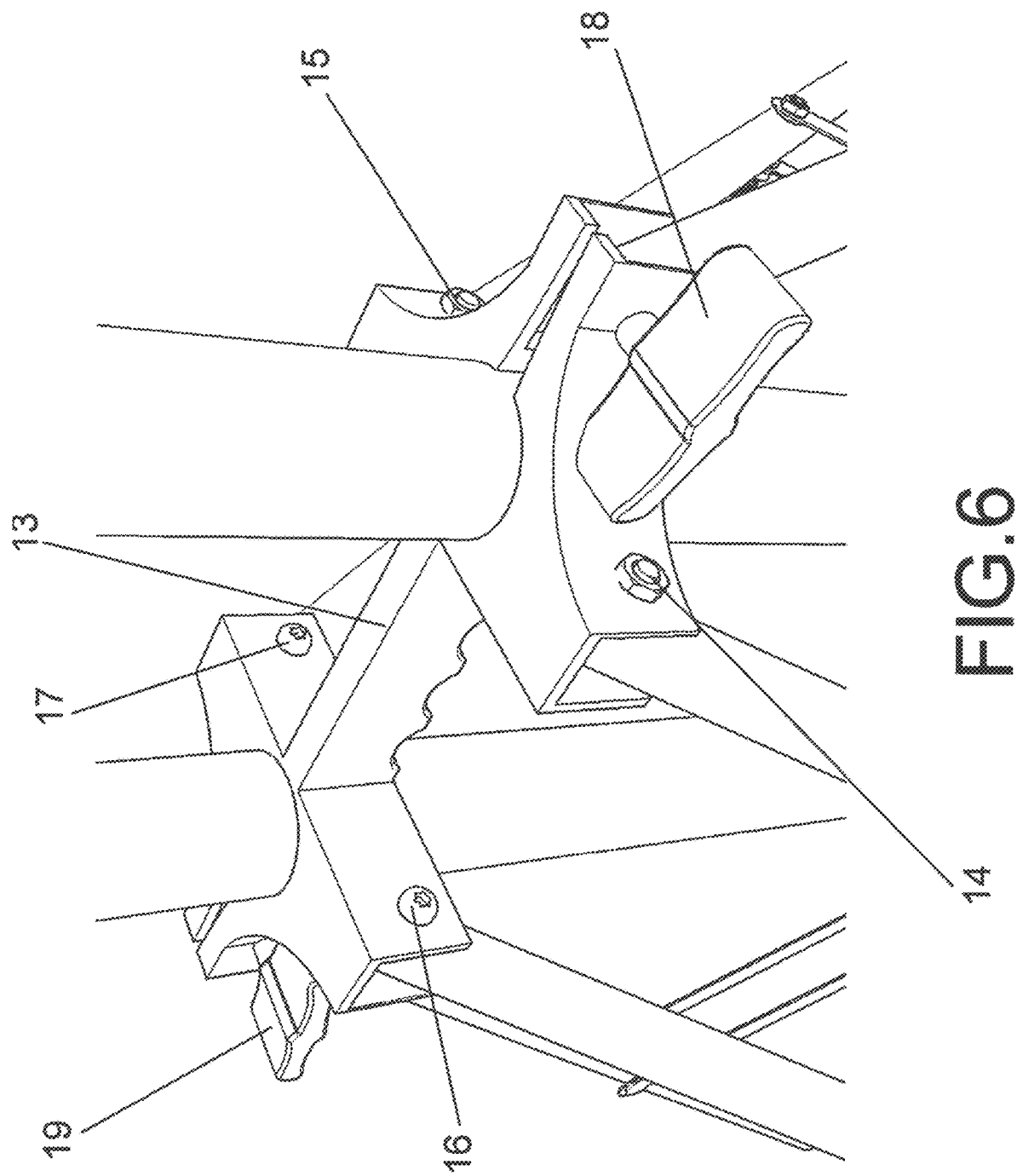
FIG. 6 shows an enlarged left-side perspective view of the upper double-cross type joint.
Figure 7:
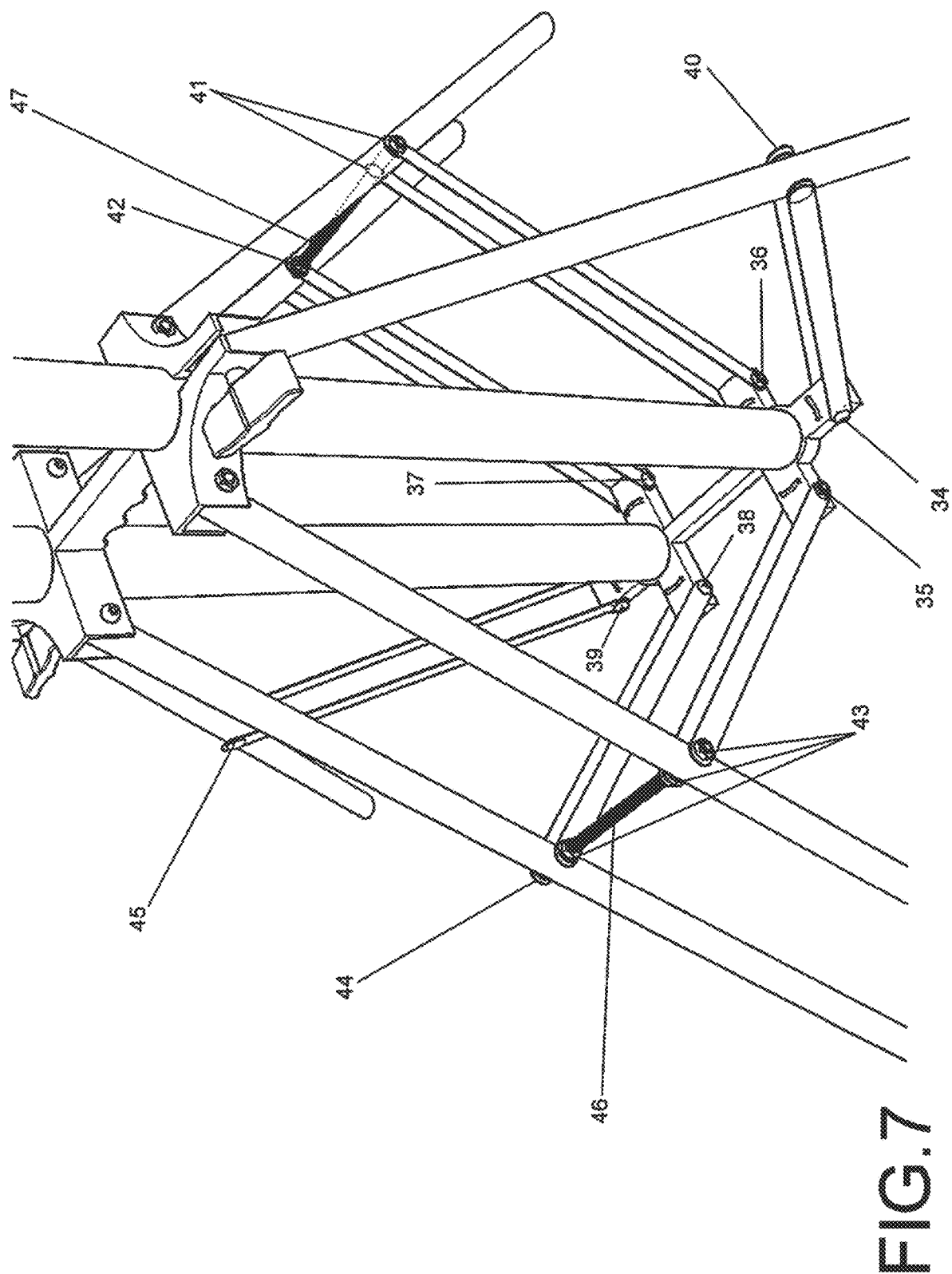
FIG. 7 shows an enlarged left-side perspective view of both six legs and twelve brace support rods are unfolded where sixpod areunfolded.
Figure 8:
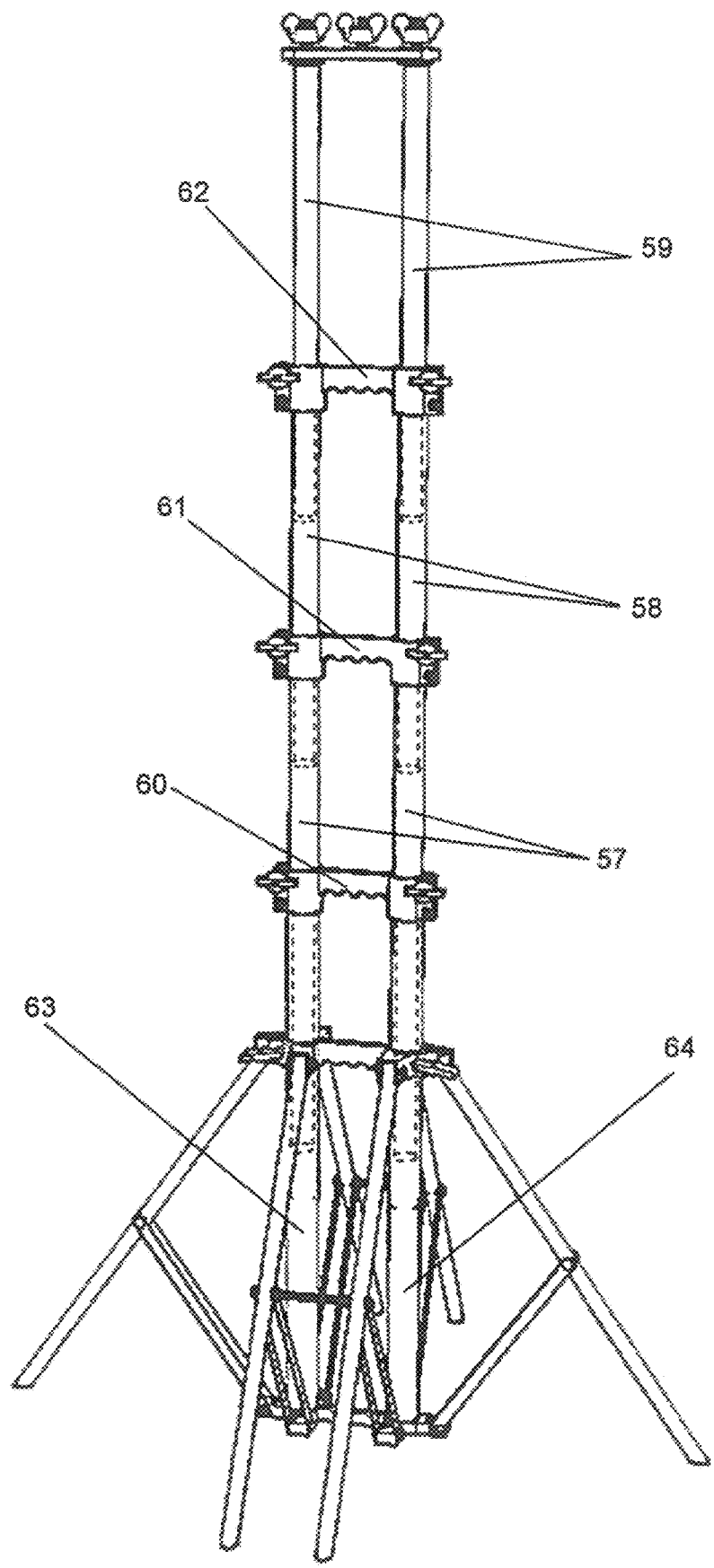
FIG. 8 shows a perspective view of sixpod stand wherein three respective rods in two respective columns are pulled up and extended.

Sixpod stand for camera and the like comprises two columns 1,2 which are hinged to each other through two double-cross type joints, wherein one double-cross type joint 3 (denoted as "upper double-cross type joint" as below) is located in the upper part of two respective columns and the other double-cross type joint 4 (denoted as "lower double-cross type" as below) is located in the bottom part of two respective columns. Six legs 5,6,7,8,9,10 are first hinged to upper double-cross type joint 3 through six corresponding clamping means, 14,15,16,17, 18, 19 fixed or upper double cross-type joint 3. Those six corresponding clamping means comprise six respective bolts and nuts. Respective four corresponding means of total six corresponding clamping means comprise four boles and nuts 14, 15,16,17. Remaining two respective means comprise two respective bolts 20,21 and two butterfly-typed nuts 18, 19. Respective six corresponding means tightly fastens six legs with the upper double-cross typed joint.

Respective six legs have six respective holes on their respective tops. Respective six corresponding bolts penetrate the holes of six respective holes and respective six nuts could clamp tightly those bolts so that six legs are tightly fastened on the upper double-cross type joint.

Twelve supporting brace rods 22-33 connects the lower double-cross typed joint 4 with six legs 5,6, 7, 8,9, 10 through twelve supporting means 34-45 wherein six supporting means are hinged on the lower double-cross typed joint and the other six supporting means are hinged on the middle of each or six legs.

Respective six ends of lower double-cross typed joint have respective holes and the respective six middle spots of six legs also have holes. The respective twelve supporting brace rods also have respective holes at both ends.

Twelve supporting means comprise respective ten bolts and fourteen nuts. First six respective bolts penetrate into both six respective boles of lower double-cross typed joint and holes in the lower end of twelve respective supporting brace rods and then six respective nuts shall clamp lower double-cross typed joint and twelve respective supporting brace rods.

Second, twelve respective supporting brace rods 22-33 will be also connected to six respective middle spots 40-45 of six legs. Two bolts 40, 45 shall penetrate holes both in the upper ends of four respective supporting brace rods and in the middle spot of two respective legs. Then two respective nuts shall clamp four supporting brace rods and two legs respectively.

Another two bolts 46, 47 respectively shall penetrate both holes in the upper ends of eight supporting brace rods 22, 23, 24, 25, 30, 31, 32,33 and holes in the middle spots of four legs 5, 6, 9, 10. Then six respective nuts 41, 42, 43 shall clamp them above.

Sixpod can be unfolded by pulling out two bolts 46, 47.

On the top of two respective columns 1, 2, there are located three respective joints 48, 49, 50 with two respective twisting clamps 51-56 one by one.

Within two respective columns having respective empty spaces in its respective interior part, there are located three respective rods by inner surface by outer surface 57, 58, 59. The respective rods can be extended by pulling up three respective rods in sixpod's two respective columns.

The first respective rods 57 in two respective columns are clamped with the first joint with two twisting clamps 60, baring outer surface of the first respective rods 57 face the inner surface of two respective columns 63.

The second respective rods 58 in two respective first rods are clamped with the second joint 61 with two twisting clamp, having the outer surface of the second respective rods face the inner surface of the first respective first rods 57.

The third respective reds 59 in respective second rods 58 are clamped with the third joint 62 with two twisting clamp, having the outer surface of the third respective rods 59 face the inner surface of the second respective rods 58.

On the top of the third respective rods 59 in respective second rod 58, there could be placed one three-hole bar with three threaded bolts with three butterfly-typed nuts, or there could be placed one two-hole bar with two threaded bolts with two butterfly-typed nuts or there could be placed one two-hole bar with one threaded bolt with one butterfly-typed nut. An owner of sixpod stand could replace the top parts according to what he or she would place on the top of the third respective rods.

Figure 9:
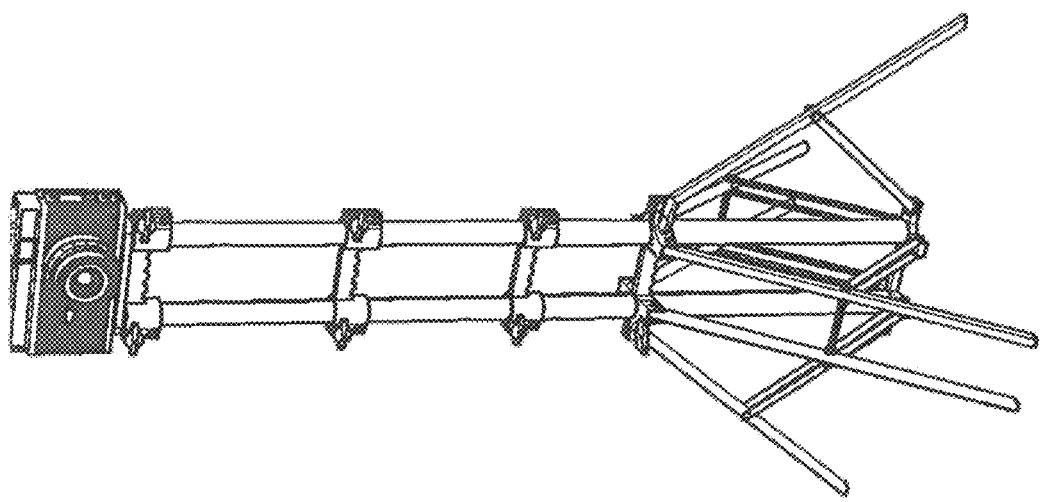
FIG. 9 shows a perspective view of sixpod wherein one camera is placed on the top of sixpod.
Figure 10:
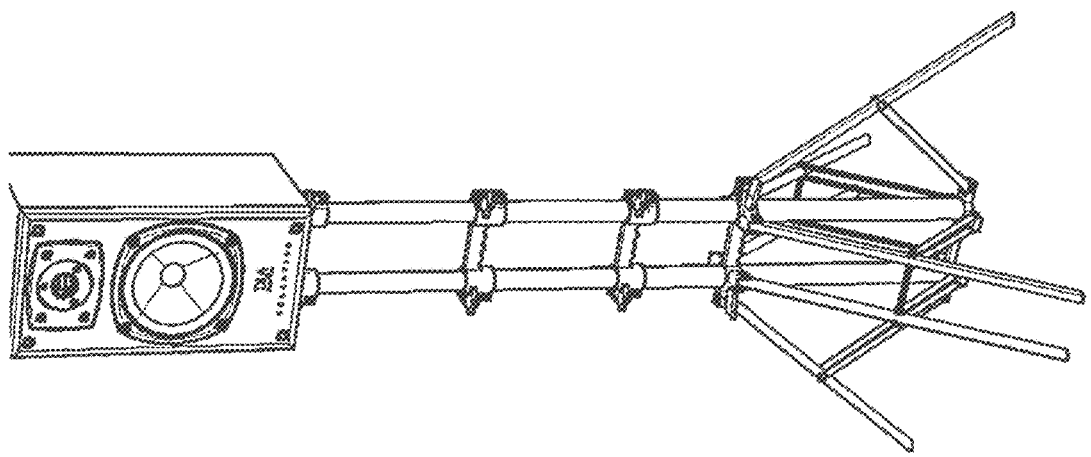
FIG. 10 shows a perspective view of sixpod wherein one speaker is placed on top of sixpod.
Figure 11:
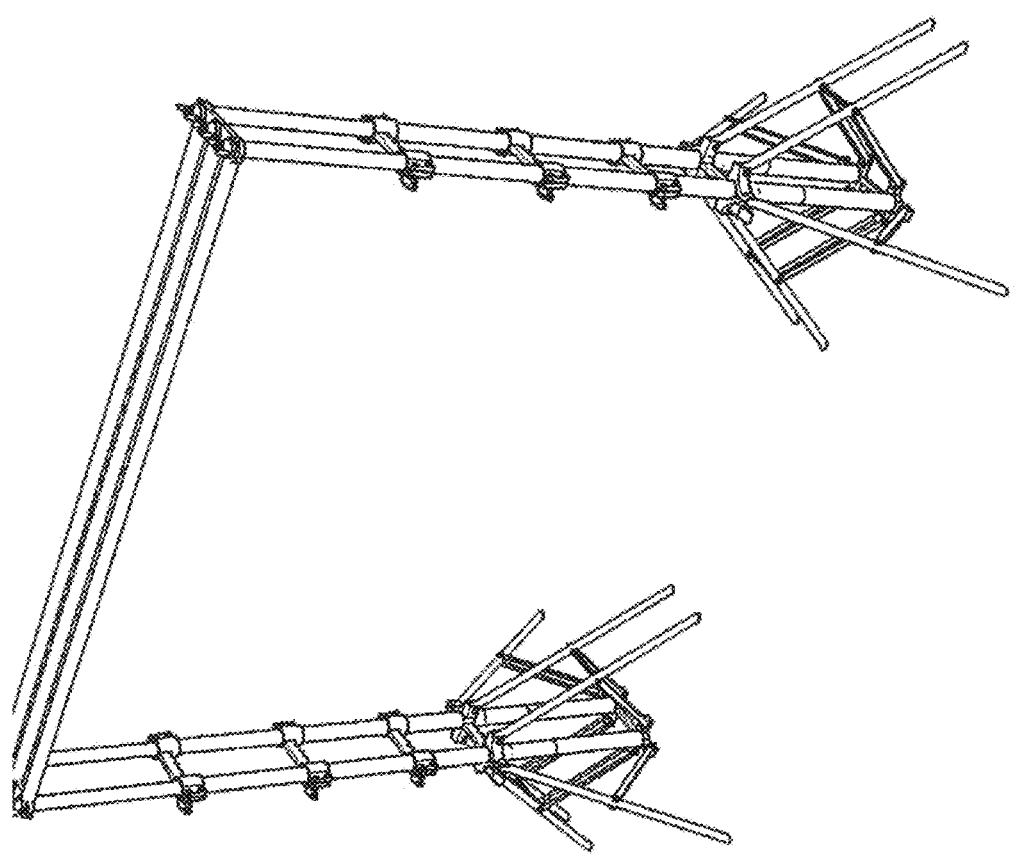
FIG. 11 shows a perspective view of two sixpods wherein three connecting bars are placed on the tops of two perspective sixpods for the purpose of placing a photo studio background on three connecting bars

The FIG. 9 shows an example wherein a camera is placed on the top of sixpod stand. The FIG. 10 shows an example wherein a speaker is placed on the top of sixpod stand. The FIG. 11 shows an example wherein a photo studio background support is placed on two respective sixpod stands.

What is claimed is:

1. A sixpod comprising:

two columns which are connected to each other through double-cross typed joints, wherein the double-cross typed joints include an upper double-cross typed joint located at an upper part of the two columns and a lower double-cross typed joint is located at a bottom of the two columns, wherein each of the two columns has an interior space;

six legs hinged to the upper double-cross typed joint through six corresponding clamping means;

the six corresponding clamping means include six pairs of a bolt and a nut to join the six legs to the upper double-cross typed joint;

twelve supporting brace rods connecting the lower double cross-typed joint to middle spots of the six legs via ten bolts and fourteen nuts, wherein four of the six legs comprise two pairs of two legs; a first pair of the two pairs of legs and four of the twelve supporting brace rods are penetrated by a first bolt of the ten bolts and joined via the first bolt and three first nuts of the fourteen nuts; a second pair of the two pairs of legs and another four of the twelve supporting brace rods are penetrated by a second bolt of the ten bolts and joined via the second bolt and three second nuts of the fourteen nuts; wherein each remaining leg of the six legs is joined to two remaining supporting brace rods of the twelve supporting brace rods via a third bolt of the ten bolts and a third nut of the fourteen nuts;

first, second, and third extendable rods, wherein the first extendable rods are at least partially positioned within the two columns respectively, the second extendable rods are at least partially positioned within the first extendable rods respectively, and the third extendable rods are at least partially positioned within the second extendable rods, respectively;

first, second, and third joint stacked one by one above the upper double cross-typed joint, wherein the first joint connects the two columns to each other via a first set of two twisting clamps, the second joint connects the first extendable rods to each other via a second set of two twisting clamps; and the third joint connects the second extendable rods to each other via a third set of two twisting clamps, and wherein the third extendable rods include one bar placed on tops of the third extendable rods, and the bar has at least one hole with a threaded bolt having a butterfly-typed nut, and a number of the threaded bolt having a butterfly-typed nut is same as that of the hole.

2. The sixpod of claim 1, wherein each of the first extendable rods having an outer surface that substantially faces an inner surface of each of the two columns, wherein each of the second extendable rods has an outer surface that substantially faces an inner surface of the first extendable rods, wherein each of the third extendable rods has an outer surface that substantially faces an inner surface of the second extendable rods, and wherein the first joint precedes the second joint, the second joint precedes the third joint, and the third joint is arranged towards a top of each of the three extendable rods.

3. The sixpod of claim 2, wherein the bar is a three-hole bar with three threaded bolts having three butterfly-typed nuts.

* * * * *